Oct. 30, 1928.

R. L. OSBORNE 1,689,929

TRANSFORMER

Filed June 19, 1926

INVENTOR.
ROBERT L. OSBORNE

BY

ATTORNEY.

Patented Oct. 30, 1928.

1,689,929

UNITED STATES PATENT OFFICE.

ROBERT L. OSBORNE, OF DETROIT, MICHIGAN, ASSIGNOR TO DONGAN ELECTRIC MANUFACTURING COMPANY, OF DETROIT, MICHIGAN, A CORPORATION OF MICHIGAN.

TRANSFORMER.

Application filed June 19, 1926. Serial No. 117,030.

This invention relates to transformers and the object of the invention is to provide a transformer particularly adapted for use in battery eliminator circuits for radio use.

One of the principal objects of the invention is to provide a transformer for use in a circuit for supplying direct current to the plate circuit of a radio receiving set from an alternating current source.

Another object of the invention is to provide a transformer having a single layer winding between the primary and secondary winding which is grounded and acts as a shield to remove the static electricity effects and objectionable electrical disturbances from the circuit in which the transformer is used.

Another object of the invention is to wind the coils so that the output leads of the secondary are as far away from the primary as possible in order to reduce the undesirable influence of the primary on the secondary as far as possible.

These objects and the several novel features of the invention are hereinafter more fully described and claimed and the preferred form of construction by which these objects are attained is shown in the accompanying drawings in which—

Figure 1:
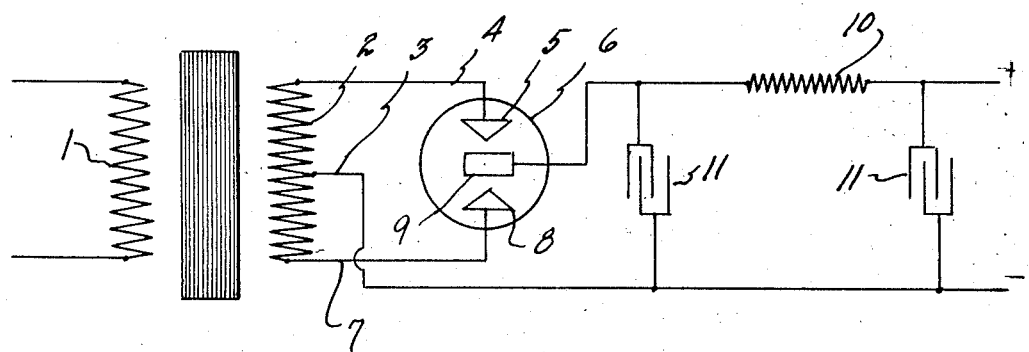
Fig. 1 is a diagrammatic view of the usual type of B battery eliminator circuit.

In the usual B battery eliminator circuit shown in Fig. 1 a primary coil 1 is provided having leads adapted to be connected into the usual alternating current lighting circuit. The usual secondary 2 is provided having a lead 3 at a central point in the coil at what is called zero potential. This forms the negative side of the output circuit. The lead 4 from one end of the secondary coil 2 is connected to an electrode 5 of the three electrode rectifier tube 6 which is commonly known as a full wave rectifier. The lead 7 from the opposite end of the secondary coil 2 is connected to an electrode 8 within the tube 6. A third electrode 9 within the said tube is connected to the positive side of the output circuit which contains an impedance coil 10. Condensers 11 are also connected between the positive and negative sides of the output circuit.

Figure 2:
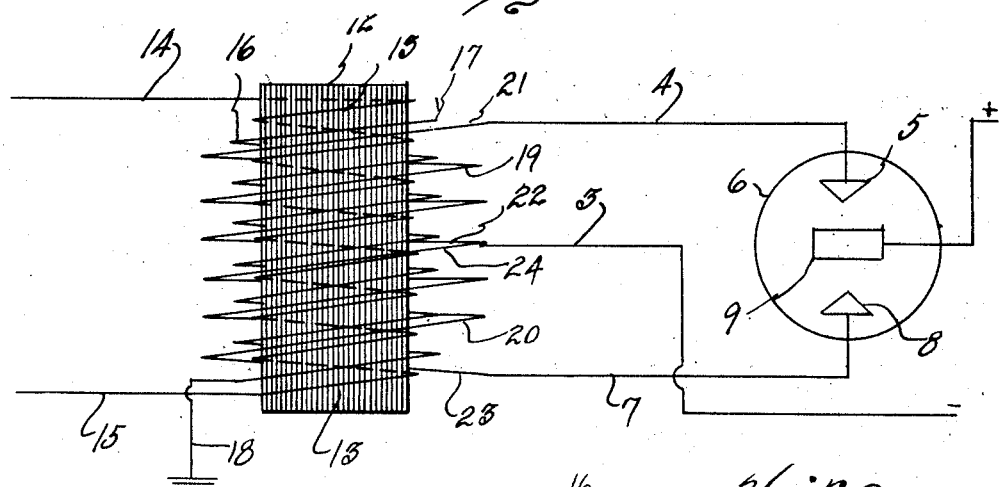
Fig. 2 is a diagrammatic view showing my improved transformer as connected in the said circuit.
Figure 3:
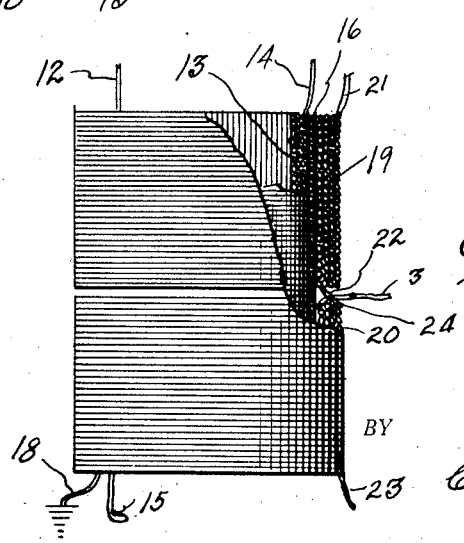
Fig. 3 is an elevation of the transformer partially in section.

In this device the alternating current is induced from the coil 1 into the coil 2. The alternating current consists of a series of alternating positive and negative impulses. For this reason the lead 3 is placed at what is known as the point of zero potential of the secondary coil. With this arrangement the positive impulse passes through the lead 4 to the electrode 5 from which it flows through the vacuum tube 6 to the electrode 9 and into the positive side of the output circuit. The negative impulse flows through the lead 7 and from the electrode 8 to the electrode 9 and also passes through the positive side of the output circuit. By this arrangement the output from the electrode 9 consists of a series of direct current impulses. However this pulsating current must be reduced to a continuous flowing direct current and this is accomplished by means of the condensers 11 which act as successive miniature storage tanks in storing up the current and by means of the impedance coil together with the condensers 11 the flow is retarded so that the final output is a fairly steady flowing direct current. However by making a practical test by connecting a telephone receiver to the positive and negative output leads of this circuit shown in Fig. 1 it will be noticed that this circuit is slightly noisy. By utilizing my improved transformer shown in Figs. 2 and 3 this noise is entirely eliminated so that the circuit is perfectly quiet under a critical test with the telephone receivers. My transformer consists of an iron core indicated at 12 in Fig. 2 about which the primary coil 13 is wound. This is a layer winding having a lead 14 shown in Figs. 2 and 3 and a lead 15 also shown in the said figures. This is wound up as a layer wound coil. A single layer 16 is then wound over the primary coil 13 having a free end 17 at one end and the opposite end 18 of this coil is grounded. The secondary consists of two coils 19 and 20. The coil 19 consists of a wire 21 which is layer wound from the bottom outwardly to form the coil and a lead 22 is taken from the bottom layer of the coil. The coil 20 is an exact duplicate of the coil 19 and is provided with leads 23 and 24. The coils 19 and 20 are wound exactly the same except that the coil 20 is reversed when it is placed on the transformer to bring the lead 24 from the inner layer adjacent the lead 22 from the inner layer of the coil 19 at the abutting ends of the coils 19 and 20. The leads 22 and 24 are connected in the circuit to the negative output lead 3. The lead 23 from the outer layer is connected to the wire 7 which in turn is connected to the electrode 8 of the vacuum tube 6 while the lead 21 from the outer layer of the coil 19 is connected to the wire 4 which is connected to the electrode 5 of the vacuum tube 6. With this device the current flowing through the primary is induced into the secondary consisting of the two coils 19 and 20. The shield or screen formed from the wire 16 has considerable effect in absorbing what static electricity may exist between the primary and secondary coils, the coil 16 being grounded to carry off the objectionable electrical disturbances. By taking the leads 21 and 23 at the outer ends of the coils from the top layer of the coils 19 and 20 these layers are the furthest from the primary coil and consequently the primary coil has the least objectionable effect on these layers and consequently considerable of the disagreeable noises of the normal circuit of this type are eliminated in the transformer. The theory in this case is rather difficult to apply as only this particular relationship of parts will eliminate the objectionable electrical disturbances from the output circuit. If the coil 20 is reversed in its position or if the leads are reversed the objectionable electrical disturbances are present in the output circuit. With this transformer the positive impulse passes through the coil 19 and to the electrode 5 of the rectifying tube while the negative impulses passes through the coil 20 and to the electrode 8 of the said tube, both impulses being transferred to the electrode 9 by electron discharge.

While I have shown a single full wave rectifier tube in the drawings it will be readily understood that a tube may be used for rectifying each side of the alternating current wave or any other means may be utilized for rectifying both sides of the alternating current wave.

From the foregoing description it becomes evident that the device is very simple and efficient in operation, will eliminate the objectionable electrical disturbances from a circuit of this type and provides a device which accomplishes the objects described.

Having thus fully described my invention, its utility and mode of operation, what I claim and desire to secure by Letters Patent of the United States is—

1. A transformer comprising a core, a primary winding on the said core, a shield winding consisting of a single layer wound about the primary, one end of the shield winding being free and the opposite end being grounded, a secondary winding about the shield winding consisting of two layer wound coils positioned in reverse relation about the shield winding, the inner layers of the two coils being electrically connected, and the outer layers of the two coils being provided with output terminals as and for the purpose described.

2. In a transformer, a core, a layer wound primary about the said core, a shield winding about the primary consisting of a single layer grounded, a secondary consisting of two similar layer wound coils superimposed in reverse end to end relation on the shield winding, one lead being taken from the inner layers of the secondary coils at the abutting ends connected together, and a pair of leads being taken from the opposite ends of the secondary coils and from the outer layers thereof.

3. In a transformer, a core, a layer wound primary about the core, a grounded shield winding about the primary, and a secondary consisting of two layer wound coils superimposed in reverse relation on the shield winding and having the inner layers thereof connected together at the abutting ends of the coils to provide a lead, the leads from the outer layers being taken off from the outer ends of the coils.

4. A transformer comprising a core, a primary winding on the said core, a shield winding about the primary winding, one end of the shield winding being grounded and the other end being free, and a secondary winding about the shield winding consisting of two layer wound coils having the terminals from the inner layers connected together at the abutting ends of the coils to provide a central lead.

5. A transformer comprising a core, a primary winding on the said core, a grounded shield winding wound about the primary, a secondary winding about the shield winding consisting of two layer wound coils having the terminals of the inner layers connected together to provide a central lead and the terminals of the outer layers providing a lead at each end of the secondary.

In testimony whereof, I sign this specification.

ROBERT L. OSBORNE.